US012769077B2

(12) United States Patent
Sato et al.

(10) Patent No.: US 12,769,077 B2
(45) Date of Patent: Oct. 20, 2026

(54) OPTICAL FIBER CABLE

(71) Applicant: SUMITOMO ELECTRIC INDUSTRIES, LTD., Osaka (JP)

(72) Inventors: Fumiaki Sato, Osaka (JP); Yuuki Shimoda, Osaka (JP); Satoshi Ohnuki, Osaka (JP); Takayuki Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 276 days.

(21) Appl. No.: 18/580,487

(22) PCT Filed: Jul. 19, 2022

(86) PCT No.: PCT/JP2022/028005
§ 371 (c)(1),
(2) Date: Jan. 18, 2024

(87) PCT Pub. No.: WO2023/002971
PCT Pub. Date: Jan. 26, 2023

(65) Prior Publication Data

US 2024/0319466 A1 Sep. 26, 2024

(30) Foreign Application Priority Data

Jul. 21, 2021 (JP) ................................ 2021-120787

(51) Int. Cl.
*G02B 6/52* (2006.01)
*G02B 6/44* (2006.01)

(52) U.S. Cl.
CPC ............... *G02B 6/52* (2013.01); *G02B 6/443* (2013.01); *G02B 6/4436* (2013.01)

(58) Field of Classification Search
None
See application file for complete search history.

(56) References Cited

U.S. PATENT DOCUMENTS 5,884,384 A * 3/1999 Griffioen ............ F16L 55/1657 226/97.1
6,940,018 B1 * 9/2005 Dewhirst ................ H02G 1/08 248/68.1
9,291,780 B2 3/2016 Lu et al.
(Continued)

FOREIGN PATENT DOCUMENTS

CA 3067994 A1 1/2019
EP 2548068 B1 5/2020
(Continued)

OTHER PUBLICATIONS

Machine translation for WO2020/256019, (Year: 2020).*
(Continued)

*Primary Examiner* — Jerry Rahll
(74) *Attorney, Agent, or Firm* — McDonald Hopkins LLC

(57) ABSTRACT

An optical fiber cable for air-blown installation includes: a plurality of optical fibers or a plurality of optical fiber ribbons; a cable sheath accommodating the plurality of optical fibers or the plurality of optical fiber ribbons; at least one tensile strength member embedded in the cable sheath; and a connection member connected to end portions of the plurality of optical fibers or end portions of the plurality of optical fiber ribbons.

4 Claims, 4 Drawing Sheets

(56) References Cited

U.S. PATENT DOCUMENTS

| | | | | |
|---|---|---|---|---|
| 2005/0109518 | A1* | 5/2005 | Blacklaw | E21B 23/08 166/383 |
| 2012/0248392 | A1 | 10/2012 | Allen et al. | |
| 2014/0219609 | A1 | 8/2014 | Nielson et al. | |
| 2014/0321813 | A1 | 10/2014 | Lu | |
| 2015/0016795 | A1 | 1/2015 | Sasaoka et al. | |
| 2017/0153405 | A1* | 6/2017 | Bringuier | G02B 6/4436 |
| 2019/0064469 | A1* | 2/2019 | Kumar | G02B 6/4433 |
| 2020/0103604 | A1 | 4/2020 | Bradley | |
| 2020/0371299 | A1 | 11/2020 | Gniadek et al. | |
| 2022/0128783 | A1* | 4/2022 | Sahoo | G02B 6/4434 |
| 2022/0365300 | A1 | 11/2022 | Sato et al. | |

FOREIGN PATENT DOCUMENTS

| | | | | |
|---|---|---|---|---|
| EP | 3796060 | A1 | 3/2021 | |
| EP | 2312354 | B1 | 5/2021 | |
| EP | 4067961 | A1 | 10/2022 | |
| EP | 4403970 | A1 | 7/2024 | |
| EP | 4465102 | A1 | 11/2024 | |
| GB | 2600001 | A | 4/2022 | |
| JP | H02-084602 | A | 3/1990 | |
| JP | 2015-052704 | A | 3/2015 | |
| JP | 2020-204752 | A | 12/2020 | |
| WO | 2014/109395 | A1 | 7/2014 | |
| WO | WO-2020256019 | A1 * | 12/2020 | G02B 6/4432 |
| WO | 2023/048922 | A1 | 3/2023 | |
| WO | 2023/175961 | A1 | 9/2023 | |

OTHER PUBLICATIONS

International Search Report dated Sep. 27, 2022 issued in PCT/JP2022/028005.

Written Opinion dated Sep. 27, 2022 issued in PCT/JP2022/028005.

* cited by examiner

OPTICAL FIBER CABLE

CROSS-REFERENCE TO RELATED APPLICATIONS

The present application claims priority based on Japanese Application No. 2021-120787 filed on Jul. 21, 2021, and incorporates all the contents described in the Japanese Application.

TECHNICAL FIELD

The present disclosure relates to an optical fiber cable.

JP2020-204752A discloses an optical fiber cable for air-blown installation that includes a plurality of optical fiber ribbons, a cable sheath, and a tensile strength member embedded inside the cable sheath.

SUMMARY OF INVENTION

An optical fiber cable for air-blown installation according to an aspect of the present disclosure includes:

- a plurality of optical fibers or a plurality of optical fiber ribbons;
- a cable sheath accommodating the plurality of optical fibers or the plurality of optical fiber ribbons;
- at least one tensile strength member embedded in the cable sheath; and
- a connection member connected to end portions of the plurality of optical fibers or end portions of the plurality of optical fiber ribbons.

DESCRIPTION OF EMBODIMENTS

Figure 1:
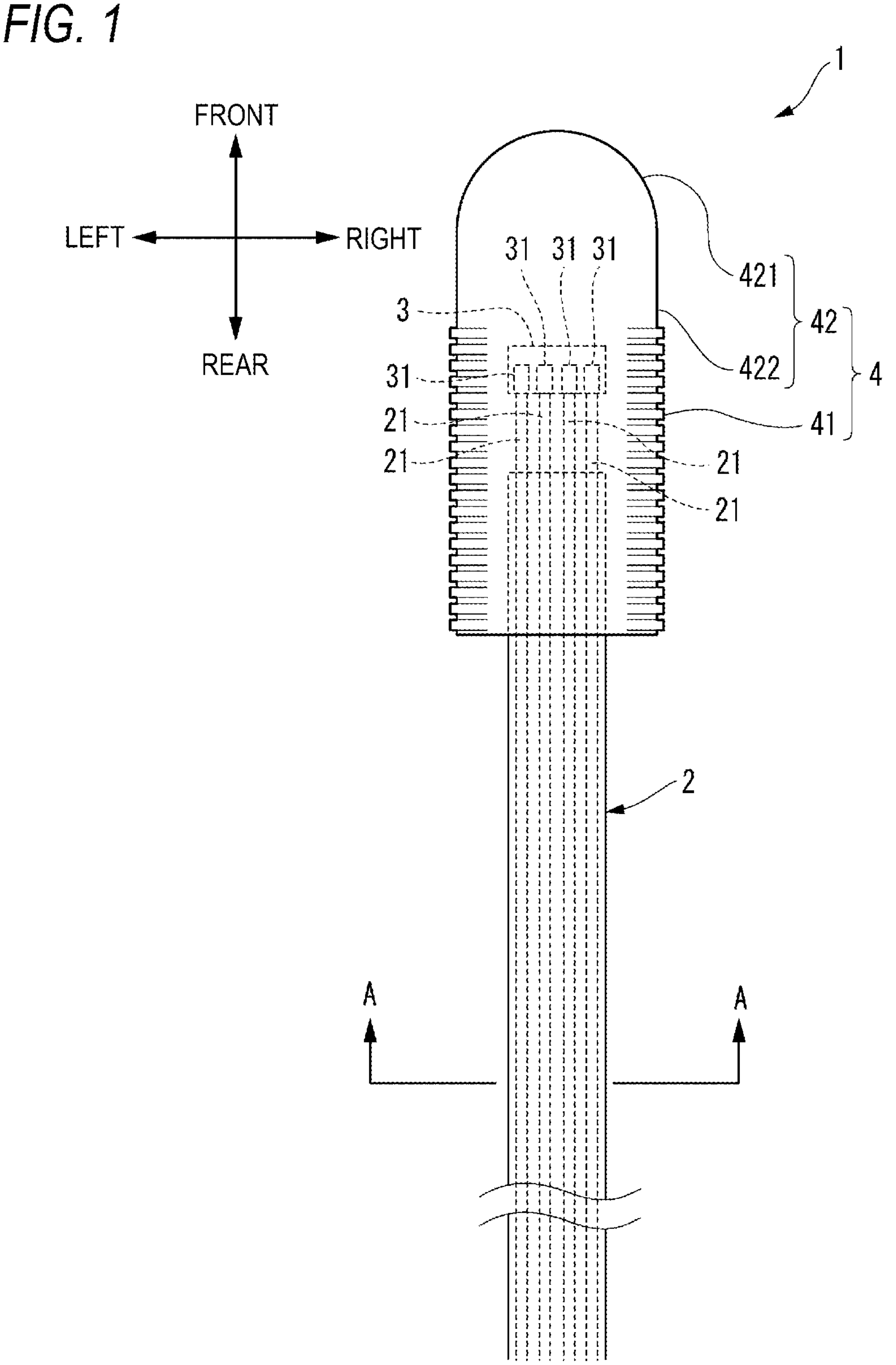
FIG. 1 is a diagram exemplifying an optical fiber cable according to an aspect of an embodiment.

Problems to be Solved by the Present Disclosure

When an optical fiber cable is laid and an optical fiber provided in the optical fiber cable is to be spliced to another optical fiber after laying, much time may be required for connection work such as fusion splicing. Further, when laying a super-multiple coaxial cable by air-blown installation, it is required to make the cable to have a small diameter and a light weight so as not to impair air-blown installation characteristics.

An object of the present disclosure is to provide an optical fiber cable for air-blown installation, which has excellent air-blown installation characteristics and has good workability of connection after laying.

DESCRIPTION OF EMBODIMENTS OF THE PRESENT DISCLOSURE

First, aspects of the present disclosure will be listed and described.

(1) An optical fiber cable for air-blown installation according to an aspect of the present disclosure includes:

- a plurality of optical fibers or a plurality of optical fiber ribbons;
- a cable sheath accommodating the plurality of optical fibers or the plurality of optical fiber ribbons;
- at least one tensile strength member embedded in the cable sheath; and
- a connection member connected to end portions of the plurality of optical fibers or end portions of the plurality of optical fiber ribbons.

According to this configuration, since the tensile strength member is embedded in the cable sheath, the optical fiber cable according to the above configuration has a certain degree of rigidity and is unlikely to be kinked even in case of air-blown installation. In addition, since the optical fiber cable having the above configuration also includes the connection member connected to end portions of the plurality of optical fibers and end portions of the plurality of optical fiber ribbons, connector mounting after laying is unnecessary. Therefore, the optical fiber cable having the above configuration has excellent air-blown installation characteristics, and it is not necessary to perform work of connection after laying.

(2) In the optical fiber cable according to (1), an outer diameter of the optical fiber cable may be 12 mm or more and 15 mm or less.

According to this configuration, when the outer diameter of the optical fiber cable is 12 mm or more and 15 mm or less, the optical fiber cable has a relatively small diameter, and thus the optical fiber cable having the above configuration has excellent air-blown installation characteristics.

(3) In the optical fiber cable according to (1) or (2), the cable sheath may be made of a flame-retardant material.

According to this configuration, it is possible to provide an optical fiber cable having flame retardance.

(4) In the optical fiber cable according to any one of (1) to (3), the optical fiber cable may include a plurality of optical fiber ribbons, and the plurality of optical fiber ribbons may be an intermittent coupling type optical fiber ribbon in which an outer diameter of an optical fiber constituting the optical fiber ribbon is 220 m or less.

According to this configuration, the optical fiber constituting the optical fiber ribbon is relatively thin when having the outer diameter of 220 μm or less, and the optical fiber ribbon is an intermittent coupling type optical fiber ribbon. Accordingly, it is possible to mount the optical fiber at a high concentration.

(5) In the optical fiber cable according to any one of (1) to (4), the optical fiber or an optical fiber in the optical fiber ribbon may be a multicore fiber.

According to this configuration, since the optical fiber or the optical fiber in the optical fiber ribbon is a multicore fiber, the optical fiber cable having the above configuration can be mounted at a high concentration.

Effects of the Present Disclosure

According to the present disclosure, it is possible to provide an optical fiber cable for air-blown installation, which has excellent air feeding characteristics and has good workability of connection after laying.

Details of Embodiments of the Present Disclosure

A specific example of an optical fiber cable according to an embodiment of the present disclosure will be described below with reference to the drawings. The present disclosure is not limited to these exemplifications, but is indicated by the scope of claims, and is intended to include all modifications within a scope and meaning equivalent to the scope of claims.

Figure 2:
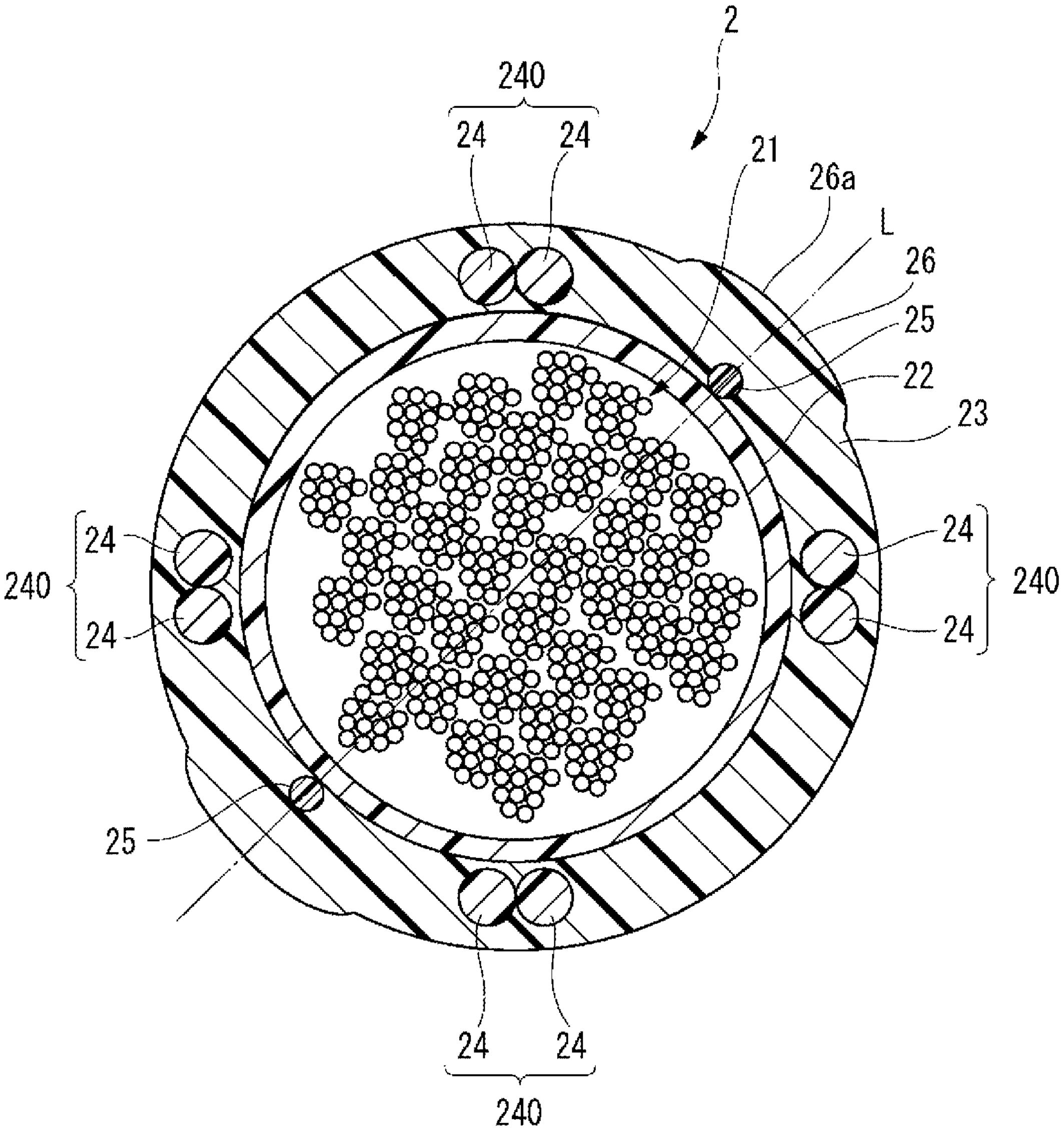
FIG. 2 is a cross-sectional view viewed along a line A-A in FIG. 1.
Figure 3:
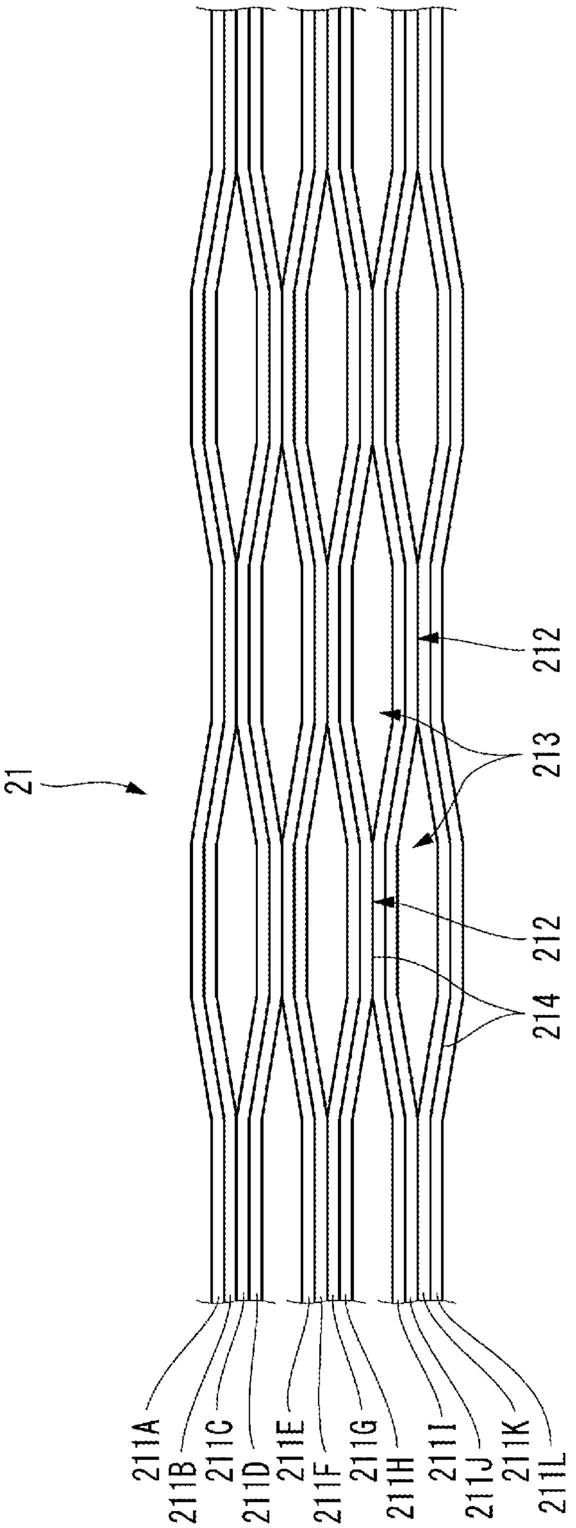
FIG. 3 is a plan view of an optical fiber ribbon accommodated in the optical fiber cable.
Figure 4:
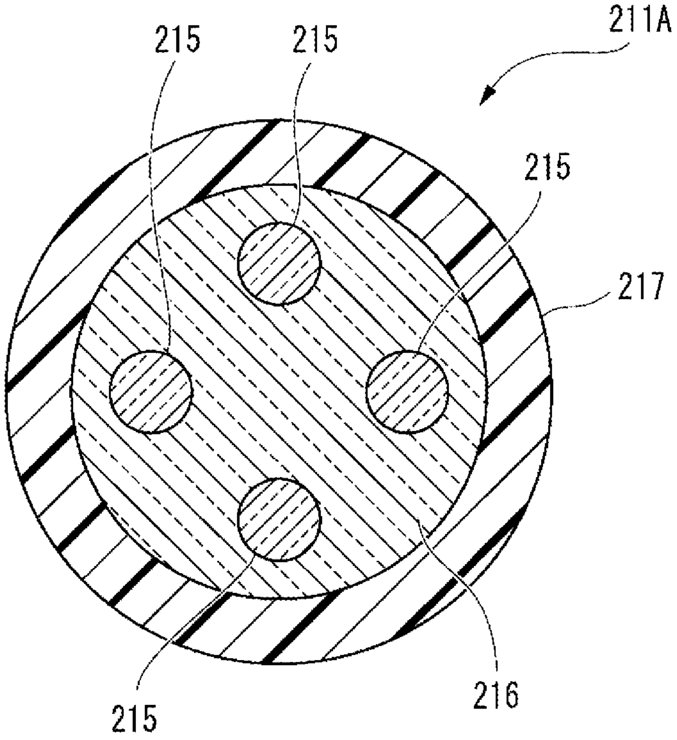
FIG. 4 is a cross-sectional view of an optical fiber provided in the optical fiber ribbon.

An optical fiber cable 1 according to an embodiment will be described with reference to FIGS. 1 to 4. In the description of the present embodiment, for convenience of description, a "front-rear direction" and a "left-right direction" will be appropriately referred to. These directions are relative directions set for the optical fiber cable 1 exemplified in FIG. 1. Here, the "front-rear direction" is a direction including a "front direction" and a "rear direction" with respect to the drawing. The "left-right direction" is a direction including a "left direction" and a "right direction" with respect to the drawing. FIG. 1 is a diagram exemplifying an optical fiber cable 1. FIG. 2 is a cross-sectional view viewed along a line A-A in FIG. 1. FIG. 3 is a plan view of an optical fiber ribbon 21 accommodated in the optical fiber cable 1. FIG. 4 is a cross-sectional view of an optical fiber 211A provided in the optical fiber ribbon 21.

As illustrated in FIG. 1, the optical fiber cable 1 includes a cable body 2, a multi-fiber connector 3 (an example of a connection member), and a protective tube 4. The optical fiber cable 1 is, for example, an optical fiber cable for air-blown installation having 432 optical fibers.

As illustrated in FIG. 2, the cable body 2 includes a plurality of optical fibers that are in the form of a plurality of optical fiber ribbons 21, a water absorbing tape 22, a cable sheath 23, at least one tensile strength member 24, at least one tear string 25 (fiber-like filler), and a plurality of protrusions 26. A cable outer diameter of the optical fiber cable 1 at the cable body 2 is 12 mm or more and 15 mm or less, and is, for example, 14 mm.

The water absorbing tape 22 is longitudinally or spirally wrapped around the whole of the plurality of optical fiber ribbons 21, for example. The water absorbing tape 22 is, for example, a tape subjected to water absorption processing by applying a water absorbing powder to a base fabric made of polyester or the like. A thickness of the water absorbing tape 22 is, for example, 0.3 mm. In the present embodiment, the optical fiber cable 1 includes the water absorbing tape 22. Alternatively, the optical fiber cable 1 may not include the water absorbing tape 22.

The cable sheath 23 covers a periphery of the water absorbing tape 22. Accordingly, the cable sheath 23 covers the plurality of optical fiber ribbons 21 from an outer side. That is, the cable sheath 23 accommodates the plurality of optical fiber ribbons 21 (the plurality of optical fibers). A plurality of tensile strength members 24 are embedded in the cable sheath 23. A thickness of the cable sheath 23 is, for example, 1.5 mm. The cable sheath 23 is made of, for example, a flame-retardant material. Examples of the flame-retardant material include a vinyl resin such as polyvinyl chloride (PVC) containing a flame-retardant inorganic material such as magnesium hydroxide or aluminum hydroxide, and a polyolefin resin such as polyethylene (PE). The cable sheath 23 may contain a release agent. Examples of the release agent include silicon-based release agents such as silicon and siloxane.

The tensile strength member 24 is arranged in a longitudinal direction of the optical fiber cable 1 along the plurality of optical fiber ribbons 21. A diameter of the tensile strength member 24 is, for example, 0.5 mm. The tensile strength member 24 is made of fiber reinforced plastic (FRP) such as aramid FRP, glass FRP, or carbon FRP. However, the tensile strength member 24 may be made of a liquid crystal polymer. The tensile strength member 24 is preferably non-inductive. The fiber-reinforced plastic (FRP) is generally a combustible material. From the viewpoint of improving the flame retardance of the entire optical fiber cable 1, the tensile strength member 24 is preferably disposed not near a surface layer of the cable sheath 23 but near a center of the optical fiber cable 1, inside the cable sheath 23.

The tensile strength member 24 has a circular cross section in a radial direction. In the present embodiment, eight tensile strength members 24 are embedded in the cable sheath 23. The eight tensile strength members 24 forms pairs, each pair including two. In the following description, the paired two tensile strength members 24 are collectively referred to as a tensile strength member set 240.

In the present embodiment, the four tensile strength member sets 240 are separated from each other and embedded in the cable sheath 23. In the optical fiber cable 1, the four tensile strength member sets 240 are spaced apart at equal intervals. Specifically, the tensile strength member sets 240 are provided, one by one, at positions facing each other across the center of the optical fiber cable 1 in a cross section in the radial direction of the optical fiber cable 1. The tensile strength member sets 240 in the cross section in the radial direction of the optical fiber cable 1 are arranged such that two straight lines are orthogonal to each other, each straight line connecting two facing tensile strength member sets 240.

The tear string 25 is provided to tear the cable sheath 23. The tear string 25 is arranged along the plurality of optical fiber ribbons 21 in the longitudinal direction of the optical fiber cable 1 in the cable sheath 23. In the present embodiment, two tear strings 25 are provided. The two tear strings 25 are provided so as to face each other at substantially intermediate positions of the adjacent tensile strength member sets 240. The four tensile strength member sets 240 are arranged line-symmetrically with respect to a straight line L connecting centers of the tear strings 25 and the optical fiber cable 1 in a cable cross-sectional view. A worker can tear the cable sheath 23 in the longitudinal direction by pulling out the tear string 25 and take out the optical fiber ribbon 21. The tear string 25 has a fiber shape, and is formed of, for example, a plastic material (for example, polyester) resistant to tension.

The protrusion 26 is provided in plurality (two in the present embodiment). The two protrusions 26 are provided along the longitudinal direction of the optical fiber cable 1. Each protrusion 26 may be provided continuously along the longitudinal direction, or may be provided intermittently. Further, the two protrusions 26 are provided so as to face each other across the center of the optical fiber cable 1 in a circumferential direction of an outer peripheral portion of the cable sheath 23, in the cross section in the radial direction of the optical fiber cable 1. In the present embodiment, the protrusion 26 is provided on the straight line L connecting the centers of the tear strings 25 and the optical fiber cable 1. The protrusion 26 is formed on the outer peripheral portion of the cable sheath 23 in a state of protruding in the radial direction of the optical fiber cable 1. The protrusion 26 has a curved surface 26*a* in a protruding direction thereof. The protrusion 26 is formed integrally with the cable sheath 23 by extrusion molding.

Here, the optical fiber ribbon 21 will be described in detail with reference to FIG. 3. As illustrated in FIG. 3, the optical fiber ribbon 21 is an intermittent coupling type optical fiber ribbon. In the optical fiber ribbon 21, in a state where optical fibers 211A to 211L are arranged in parallel in a direction orthogonal to a longitudinal direction thereof, a coupling portion 212 in which adjacent optical fibers of some or all of the plurality of optical fibers 211A to 211L are coupled, and a non-coupling portion 213 in which adjacent optical fibers are not coupled are intermittently provided in the longitudinal direction. An outer diameter of each of the optical fibers 211A to 211L is 220 μm or less, and is, for example, 180 μm or 200 μm. When the outer diameter of each of the optical fibers 211A to 211L is, for example, 200 μm, a core concentration of the optical fiber cable 1 can be set to 5 core/mm$^2$ or more.

In the optical fiber ribbon 21 according to the present embodiment, twelve optical fibers 211A to 211L are arranged in parallel. A portion where the coupling portion 212 and the non-coupling portion 213 are intermittently provided may be between a part of the optical fibers (intermittence on basis of two cores), or may be between all the optical fibers (intermittence on basis of one core). The optical fiber ribbon 21 illustrated in FIG. 3 is intermittent on basis of two cores, and the non-coupling portion 213 is not provided between the optical fibers 211A and 211B, 211C and 211D, 211E and 211F, 211G and 211H, 211I and 211J, and 211K and 211L.

The coupling portion 212 in the optical fiber ribbon 21 is formed by applying a coupling resin 214 made of, for example, an ultraviolet curable resin or a thermosetting resin between the optical fibers. By applying the coupling resin 214 between predetermined optical fibers, the coupling portion 212 and the non-coupling portion 213 are intermittently provided, and the optical fibers 211A to 211L are integrated in parallel. The coupling resin 214 may be applied only to one surface of parallel surfaces formed by the parallel optical fibers 211A to 211L, or may be applied to both surfaces. Further, the optical fiber ribbon 21 may be manufactured such that, for example, a tape resin is applied to one surface or both surfaces of the optical fibers 211A to 211L, which are arranged in parallel, to couple all the optical fibers 211A to 211L to each other, and then a part of the optical fibers 211A to 211L is cleaved by a rotary blade or the like to form the non-coupling portion 213.

Next, the optical fiber 211A will be described with reference to FIG. 4. Configurations of the optical fibers 211B to 211L other than the optical fiber 211A are the same as that of the optical fiber 211A. As illustrated in FIG. 4, the optical fiber 211A includes four cores 215, a cladding portion 216, and an outer layer portion 217. Accordingly, the optical fiber 211A is a so-called multicore fiber. The core 215 is circular in a cross section in a radial direction. A refractive index of the core 215 is higher than a refractive index of the cladding portion 216. An outer diameter of the core 215 is, for example, 5 μm to 10 μm.

The cladding portion 216 is provided in a manner of integrally surrounding the four cores 215. An outer diameter of the cladding portion 216 is, for example, 125 μm, which is larger than the outer diameter of the core 215.

The outer layer portion 217 is made of, for example, an ultraviolet curable resin (UV resin). The outer layer portion 217 is provided in a manner of covering a periphery of the cladding portion 216.

Returning to FIG. 1, the multi-fiber connector 3 will be described. The multi-fiber connector 3 is, for example, a 96-core or 144-core connector that has a base structure of an MT connector. In FIG. 1, for convenience of illustration, one multi-fiber connector 3 is illustrated, and the number of multi-fiber connectors 3 of the optical fiber cable 1 is not limited thereto. The multi-fiber connector 3 includes, for example, four ferrules 31. The ferrule 31 is, for example, a 12-core MT ferrule in which a tip end of the 12-core optical fiber ribbon 21 is inserted and fixed. The ferrule 31 is connected to an end portion of the optical fiber ribbon 21 or end portions of the optical fibers 211A to 211L of the optical fiber ribbon 21.

The protective tube 4 is made of, for example, metal. The protective tube 4 is provided at an end portion of the optical fiber cable 1. The protective tube 4 includes a flexible portion 41 having flexibility and a lid portion 42 provided in front of the flexible portion 41.

The flexible portion 41 is a cylindrical tube in a bellows shape. The multi-fiber connector 3 is accommodated in the flexible portion 41. An outer diameter of the flexible portion 41 is, for example, 20 mm. The outer diameter of the flexible portion 41 is larger than an outer diameter of the cable body 2. An allowable bending radius of the flexible portion 41 is, for example, 300 mm. However, the allowable bending radius of the flexible portion 41 is not limited thereto.

The lid portion 42 includes a front portion 421 in a substantially spherical shape and a rear portion 422 in a cylindrical shape. The lid portion 42 is hollow. The lid portion 42 is openable and closable with respect to the flexible portion 41.

The optical fiber cable 1 as described above has a certain degree of rigidity since the tensile strength member 24 is embedded in the cable sheath 23, and is unlikely to be kinked even in case of air-blown installation. The optical fiber cable 1 also includes the multi-fiber connector 3 including the ferrule 31 connected to end portions of the plurality of optical fibers 211A to 211L or end portions of the plurality of optical fiber ribbons 21. Accordingly, connector mounting after laying is unnecessary. Accordingly, the optical fiber cable 1 has excellent air-blown installation characteristics, and the work of fusion splicing after laying is unnecessary.

Further, when the outer diameter of the optical fiber cable 1 is 12 mm or more and 15 mm or less (for example, 14 mm), the optical fiber cable 1 has a relatively small diameter and thus has excellent air-blown installation characteristics.

Further, according to the optical fiber cable 1, since the cable sheath 23 is made of a flame-retardant material, and thus the optical fiber cable 1 has flame retardance.

Further, according to the optical fiber cable 1, the optical fiber constituting the optical fiber ribbon is relatively thin when having an outer diameter of 220 μm or less (for example, 180 μm or 200 μm), and the optical fiber ribbon 21 is an intermittent coupling type optical fiber ribbon. Accordingly, it is possible to mount the optical fiber at a high concentration.

Further, according to the optical fiber cable 1, since the optical fiber 211A is a multicore fiber, the optical fiber cable 1 can be mounted at a high concentration.

Although the present disclosure has been described in detail and with reference to the specific embodiments, it will be apparent to those skilled in the art that various changes and modifications can be made without departing from the spirit and scope of the present disclosure. In addition, the number, positions, shapes, and the like of the constituent members described above are not limited to those in the above-described embodiment, and can be changed to suitable numbers, positions, shapes, and the like in carrying out the present disclosure.

In the above-described embodiment, the multi-fiber connector 3 includes four ferrules 31. Alternatively, the multi-fiber connector 3 may include one or more and three or less ferrules 31, or five or more ferrules 31. The multi-fiber connector 3 may not include the ferrule 31.

Although the optical fiber cable 1 includes the multi-fiber connector 3 in the above-described embodiment, the configuration of the optical fiber cable 1 is not limited to this example. For example, the optical fiber cable 1 may include the ferrule 31 but not include the multi-fiber connector 3. In this case, the ferrule 31 is an example of the connection member.

Although the cable sheath 23 is provided with eight tensile strength members 24 in the above-described embodiment, the number of tensile strength members 24 provided in the cable sheath 23 is not limited thereto.

Although the optical fiber 211A includes four cores 215 in the above-described embodiment, the number of cores 215 provided in the optical fiber 211A is not limited to four. The optical fiber 211A may include, for example, twelve cores 215. The optical fiber 211A may include one core 215. That is, the optical fiber 211A may be a so-called single-core fiber.

What is claimed is:

1. An optical fiber cable for air-blown installation, comprising:

a plurality of optical fibers or a plurality of optical fiber ribbons;

a cable sheath accommodating the plurality of optical fibers or the plurality of optical fiber ribbons;

at least one tensile strength member embedded in the cable sheath;

a connection member connected to end portions of the plurality of optical fibers or end portions of the plurality of optical fiber ribbons; and a protective tube covering the connection member, wherein the optical fiber cable comprises a plurality of optical fiber ribbons, the plurality of optical fiber ribbons are an intermittent coupling type optical fiber ribbon in which an outer diameter of an optical fiber constituting the optical fiber ribbon is 220 μm or less, the connection member is a multi-fiber connector with 12 or more cores, the protective tube includes a flexible portion having flexibility and a lid portion provided in front of the flexible portion, and the flexible portion is a cylindrical tube in a bellows shape and an allowable bending radius of the flexible portion is 300 mm or less.

2. The optical fiber cable according to claim 1, wherein an outer diameter of the optical fiber cable is 12 mm or more and 15 mm or less.

3. The optical fiber cable according to claim 1, wherein the cable sheath is made of a flame-retardant material.

4. The optical fiber cable according to claim 1, wherein the optical fiber or an optical fiber in the optical fiber ribbon is a multicore fiber.

* * * * *